US012136395B2

(12) United States Patent
Toyomura

(10) Patent No.: US 12,136,395 B2
(45) Date of Patent: Nov. 5, 2024

(54) ELECTRO-OPTICAL APPARATUS AND ELECTRONIC DEVICE INCLUDING A TRANSISTOR FOR APPLYING A VOLTAGE TO AN ANODE OF A LIGHT EMITTING ELEMENT

(71) Applicant: Sony Semiconductor Solutions Corporation, Kanagawa (JP)

(72) Inventor: Naobumi Toyomura, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/420,792

(22) PCT Filed: Oct. 17, 2019

(86) PCT No.: PCT/JP2019/040812
§ 371 (c)(1),
(2) Date: Jul. 6, 2021

(87) PCT Pub. No.: WO2020/148958
PCT Pub. Date: Jul. 23, 2020

(65) Prior Publication Data

US 2022/0114965 A1 Apr. 14, 2022

(30) Foreign Application Priority Data

Jan. 16, 2019 (JP) ................................ 2019-005409

(51) Int. Cl.
*G09G 3/3258* (2016.01)

(52) U.S. Cl.
CPC ... *G09G 3/3258* (2013.01); *G09G 2310/0294* (2013.01)

(58) Field of Classification Search
CPC .................................................... G09G 3/3258
(Continued)

(56) References Cited

U.S. PATENT DOCUMENTS

2009/0309516 A1* 12/2009 Kim .................... G09G 3/3233 315/307
2011/0074758 A1 3/2011 Wacyk et al.
(Continued)

FOREIGN PATENT DOCUMENTS

CN 103038812 A 4/2013
CN 104809989 A 7/2015
(Continued)

OTHER PUBLICATIONS

International Search Report (PCT/ISA/210), International Application No. PCT/JP2019/040812, dated Dec. 11, 2019.
(Continued)

*Primary Examiner* — Long D Pham
(74) *Attorney, Agent, or Firm* — Michael Best & Friedrich LLP

(57) ABSTRACT

An electro-optical apparatus is provided with an active-matrix drive circuit that applies a voltage based on an image signal tone to a light-emitting element, and includes: a first transistor for driving, a source of the first transistor being connected to an anode of the light-emitting element; a second transistor for setting an anode voltage, the second transistor being connected between the anode and a power source, and determining a voltage applied to the anode; and a holding capacitor and a third transistor connected to the anode for holding the anode voltage during a light-emission period.

12 Claims, 12 Drawing Sheets

(58) Field of Classification Search
USPC ........................................................... 345/76
See application file for complete search history.

(56) References Cited

U.S. PATENT DOCUMENTS

| | | | | |
|---|---|---|---|---|
| 2012/0162275 | A1* | 6/2012 | Park | H10K 59/1213 445/24 |
| 2016/0055797 | A1* | 2/2016 | Tan | G09G 3/3258 345/206 |
| 2017/0278457 | A1 | 9/2017 | Zhu et al. | |
| 2017/0373094 | A1* | 12/2017 | Park | H01L 27/1255 |
| 2018/0158401 | A1* | 6/2018 | Wang | G09G 3/3233 |
| 2018/0190191 | A1* | 7/2018 | Zhai | G09G 3/3233 |
| 2019/0251905 | A1* | 8/2019 | Yang | G09G 3/3258 |

FOREIGN PATENT DOCUMENTS

| | | | |
|---|---|---|---|
| CN | 106486054 | A | 3/2017 |
| CN | 106782304 | A | 5/2017 |
| CN | 107025883 | A | 8/2017 |
| CN | 107039002 | A | 8/2017 |
| JP | 2005-534990 | A | 11/2005 |
| JP | 2008-191450 | A | 8/2008 |
| JP | 2014170092 | A | 9/2014 |
| JP | 2015045830 | A | 3/2015 |
| JP | 2015-188059 | A | 10/2015 |
| KR | 20150026806 | A | 3/2015 |
| KR | 20150142143 | A | 12/2015 |
| KR | 20160103017 | A | 8/2016 |
| WO | 2015/196730 | A1 | 12/2015 |

OTHER PUBLICATIONS

Notification of Transmittal of the International Search Report and the Written Opinion of the International Searching Authority, or the Declaration (PCT/ISA/220), International Application No. PCT/JP2019/040812, dated Dec. 24, 2019.

Written Opinion of the International Search Authority (PCT/ISA/237), International Application No. PCT/JP2019/040812, dated Dec. 24, 2019.

* cited by examiner

ELECTRO-OPTICAL APPARATUS AND ELECTRONIC DEVICE INCLUDING A TRANSISTOR FOR APPLYING A VOLTAGE TO AN ANODE OF A LIGHT EMITTING ELEMENT

TECHNICAL FIELD

The present technique relates to an electro-optical apparatus and an electronic device.

BACKGROUND ART

Electro-optical apparatuses which use elements such as organic light-emitting diodes ("OLEDs" hereinafter) as light-emitting elements are known. In an electro-optical apparatus, a pixel circuit including a light-emitting element, a transistor, and the like is provided, corresponding to a pixel, at each of locations where a scanning line and a data line intersect. In the pixel circuit, when a data signal at a potential based on a tone level of the pixel is applied to the gate of the transistor, the transistor supplies a current based on a voltage across the gate and source to the light-emitting element, and the light-emitting element emits light at a brightness based on the tone level.

The circuit described in PTL 1 has been proposed as an active-type OLED drive circuit. This drive circuit includes a pixel circuit capable of operating in two modes, namely one mode for current driving, and one mode for voltage driving.

CITATION LIST

Patent Literature

PTL 1

US 2011/0074758 A1

SUMMARY

Technical Problem

However, with PTL 1, when performing voltage driving, it is necessary to keep current flowing in the transistor continuously, regardless of the state of display in a screen, in order to hold the OLED anode voltage. There has therefore been a problem in that power is continuously consumed even, for example, when displaying black over the front screen.

An object of the present technique is to provide an electro-optical apparatus and an electronic device capable of solving such a problem.

Solution to Problem

An electro-optical apparatus according to the present technique is an electro-optical apparatus having an active-matrix drive circuit that applies a voltage based on an image signal tone to a light-emitting element, the apparatus including:

a first transistor for driving, a source of the first transistor being connected to an anode of the light-emitting element;

a second transistor for setting an anode voltage, the second transistor being connected between the anode and a power source, and determining a voltage applied to the anode; and a holding capacitor and a third transistor connected to the anode for holding the anode voltage during a light-emission period. The present technique is also an electronic device including the foregoing electro-optical apparatus.

Advantageous Effects of Invention

According to at least one embodiment, it can be made unnecessary to keep a transistor on in order to hold a voltage that drives a light-emitting element, which makes it possible to reduce power consumption. Also, the effects described here are not necessarily limiting, and any one of the effects described in the present technique or an effect different from them may be obtained. Further, the content of the present technique should not be interpreted limitedly according to the effects illustrated in the following description.

DESCRIPTION OF EMBODIMENTS

The embodiments described below are preferred specific examples of the present, technique and various technically preferable limitations are applied thereto. However, the scope of the present technique is not limited to the embodiments unless otherwise specified in the description below.

Figure 1:
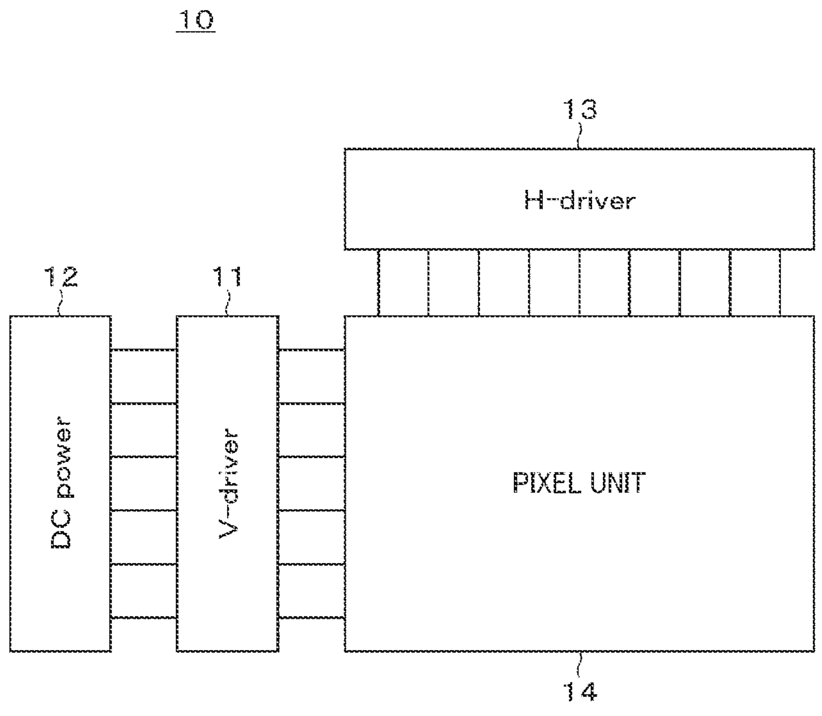
FIG. 1 is a block diagram illustrating an organic EL display apparatus including an active-matrix drive circuit to which the present technique can be applied.

Before describing the present technique, the configuration of a conventional display apparatus (electro-optical apparatus) disclosed in PTL 1 will be described. As illustrated in FIG. 1, in an organic EL display apparatus 10 including an active-matrix drive circuit, a scanning line drive circuit 11, a direct current (DC) voltage supply unit 12, a data line (signal line) drive circuit 13, and a pixel unit 14 are formed on a semiconductor substrate, e.g., a silicon substrate. With respect to the pixel unit 14, a plurality of scanning lines extend in a horizontal direction from the scanning line drive circuit 11, and a plurality of data lines extend in a vertical direction from the data line drive circuit 13.

Figure 2:
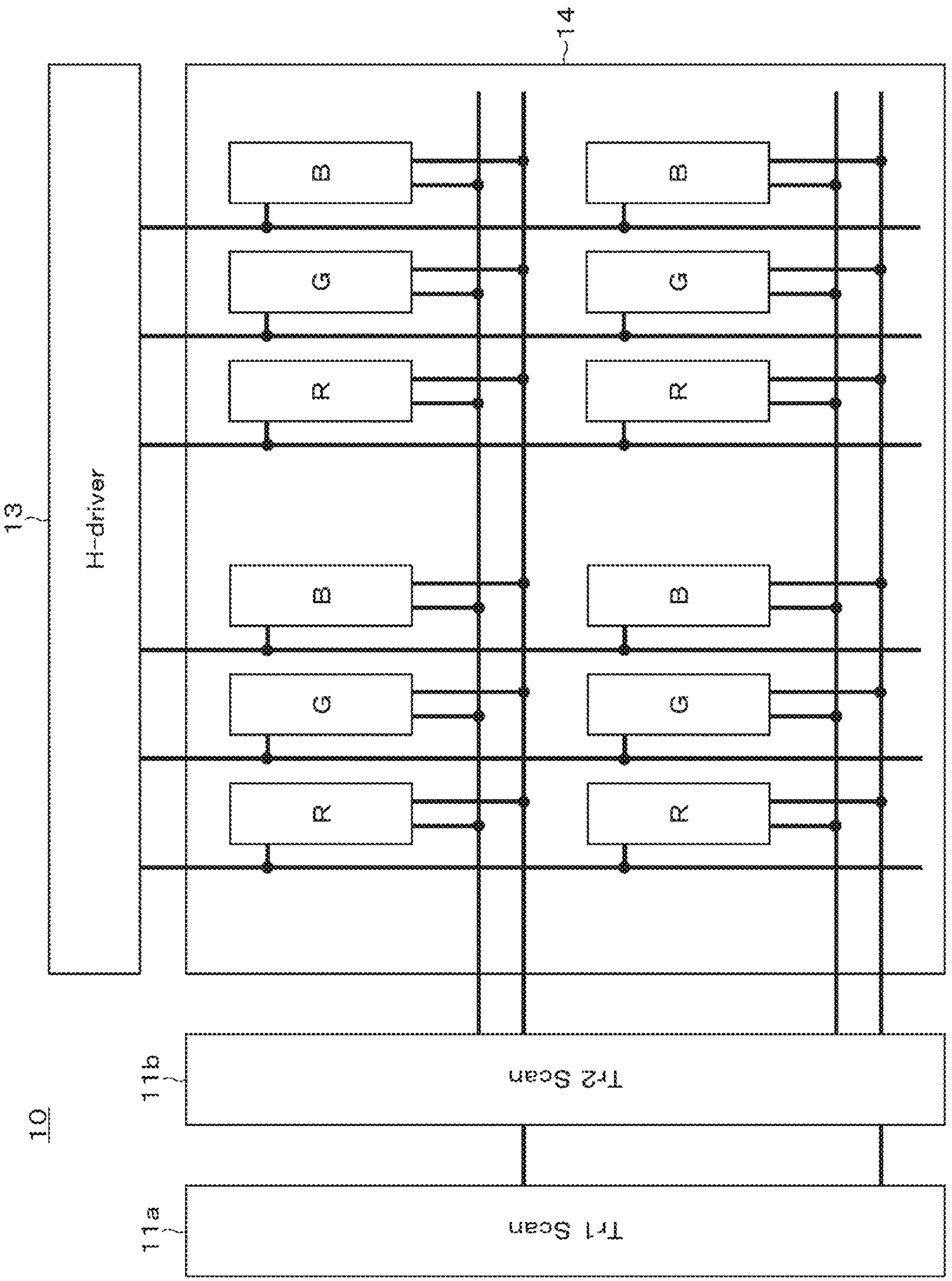
FIG. 2 is a block diagram illustrating the configuration of a pixel unit in the organic EL display apparatus.

As is partially illustrated in FIG. 2, a scanning line drive circuit 11*a* that drives a transistor Tr1 of the pixel unit, and a scanning line drive circuit 11*b* that drives a transistor Tr2 of the pixel unit, are provided. Pixel circuits connected to the data lines extending in the vertical direction and the scanning lines extending in the horizontal direction are arranged in a matrix. The pixel circuits are provided corresponding to three primary colors of pixels, as indicated by R (red), C (green), and blue (B). These three pixels represent a single dot of a color image.

Figure 3:
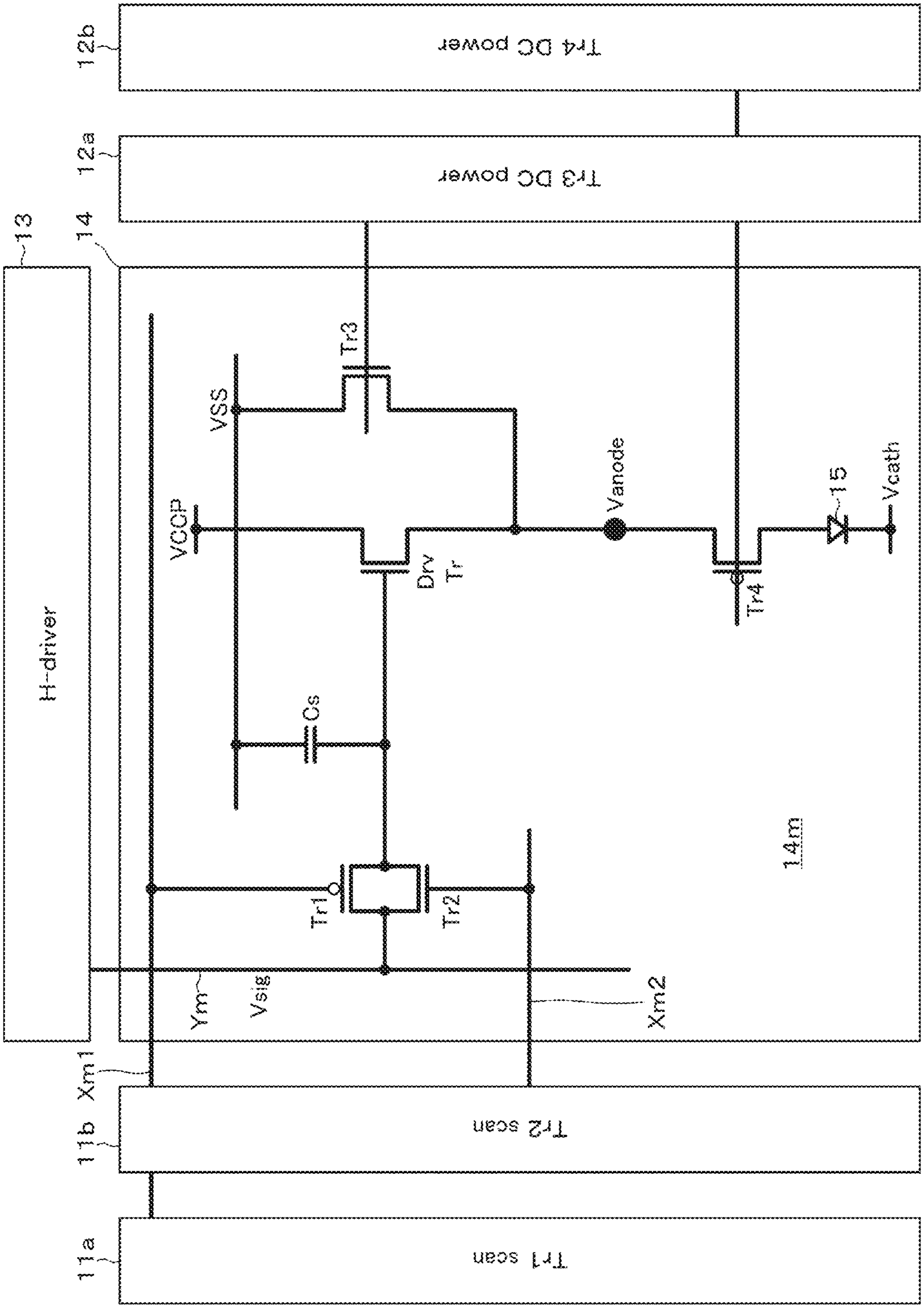
FIG. 3 is a connection diagram illustrating the configuration of a conventional pixel circuit.

FIG. 3 illustrates a pixel circuit 14*m* of a single pixel. The pixel circuit 14*m* is connected to a scanning line Xm1 from the scanning line drive circuit 11*a*, a scanning line Xm2 from the scanning line drive circuit 11*b*, and a data line Ym from the data line drive circuit 13. An anode of an OLED 15 is connected to the source of a drive transistor DrvTr through the source and drain of a transistor Tr4, and the drain of the drive transistor DrvTr is connected to a power supply line to which a DC voltage VCCP is being supplied. A DC voltage from a DC voltage supply unit 12*b* is supplied to the gate of the transistor Tr4. The source of the drive transistor DrvTr is written as an anode node Vanode. The OLED 15 is driven by a voltage at the anode node Vanode (a tone of an image signal).

The gate of the P-channel transistor Tr1 is connected to the data line Xm1, and the gate of the N-channel transistor Tr2 is connected to the data line Xm2. The respective sources and drains ID of the transistors Tr1 and Tr2 are connected to each other. A signal voltage Vsig is supplied to a common drain connection point via the data line Ym.

A common source connection point of the transistors Tr1 and Tr2 is connected to the gate of the drive transistor DrvTr. A capacitor Cs serving as a holding capacitor is inserted between a connection line connecting the common source connection point with the gate of the drive transistor DrvTr and a power supply line to which a DC voltage VSS is being supplied.

The power supply line to which the DC voltage VSS is supplied is connected to the drain of a transistor Tr3, and the source of the transistor Tr3 is connected to the source of the drive transistor DrvTr. A DC voltage from a DC voltage supply unit 12*a* is supplied to the gate of the transistor Tr3. The transistor Tr3 is an anode voltage setting transistor for determining a voltage applied to the anode. The capacitor Cs holds the signal voltage Vsig component between the gate of the drive transistor DrvTr and the power supply line to which VSS is supplied.

Figure 4:
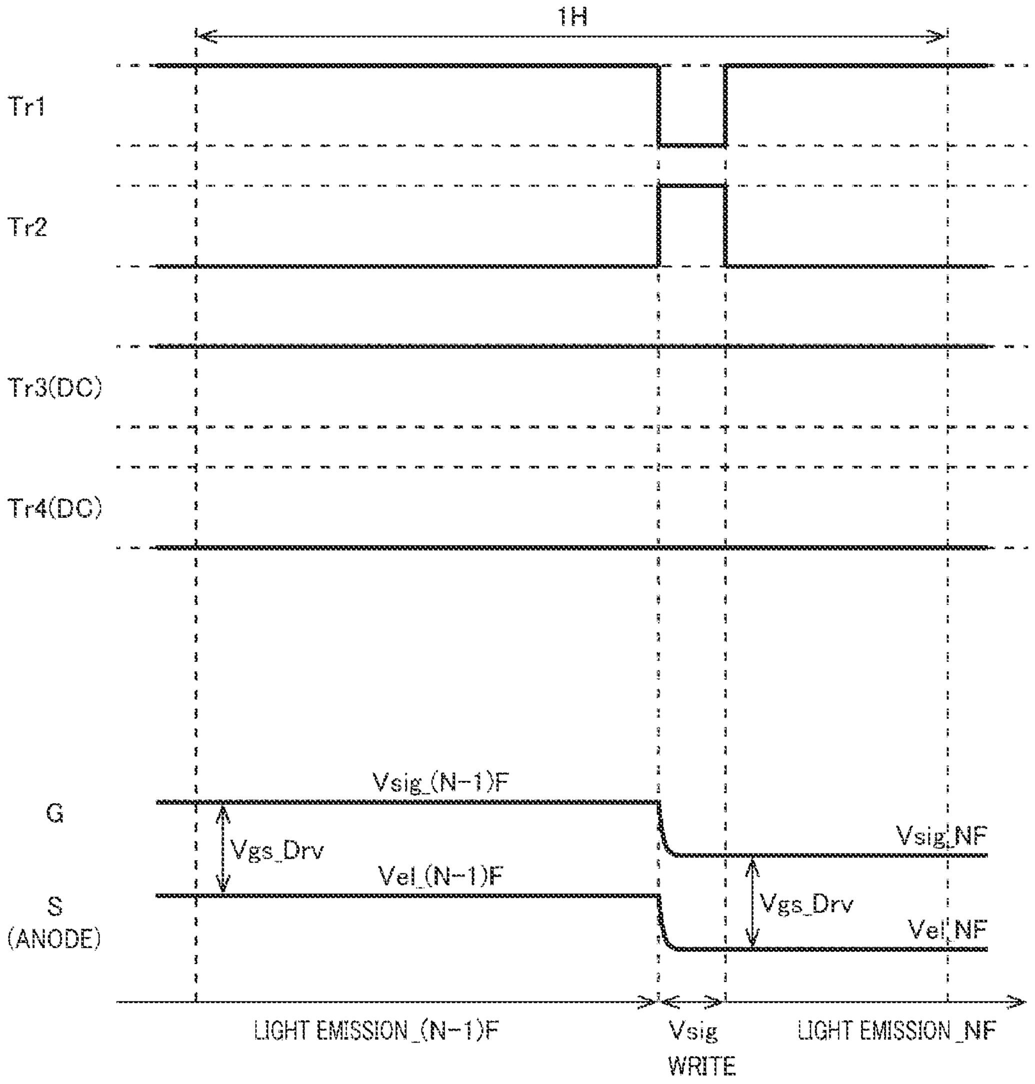
FIG. 4 is a timing chart illustrating operations of a conventional pixel circuit.

FIG. 4 is a timing chart illustrating voltage driving of the conventional pixel circuit 14*m*. This circuit is a voltage drive circuit, of a type that controls the light-emission brightness of the OLED 15 on a tone-by-tone basis by varying the voltage applied to the anode node Vanode in accordance with the signal voltage Vsig. A method for determining the voltage applied to the anode node Vanode will be described below.

In a state where the DC voltage that turns the transistor Tr3 on is applied, the transistors Tr1 and Tr2 turn on when it is time to write a signal, and the signal voltage Vsig is written. At this time, it is desirable that the gate voltage of the transistor Tr3 be set to a threshold voltage that is the highest within the panel plane.

The transistor Tr3 continues to provide a constant current, and an equivalent current flows in the drive transistor DrvTr, such that a gate-source voltage Vgs_Dry of the drive transistor DrvTr becomes a voltage corresponding to that current. When the signal voltage Vsig is written to the gate, the source voltage, i.e., the anode node Vanode, is determined as follows. Vgs_Drv is the gate-source voltage of the drive transistor DrvTr.

Vsig·Vgs_Drv

The same DC voltage as with the transistor Tr3 is applied to the transistor Tr4 as well, and thus the anode node Vanode is held at the voltage indicated by the above equation. A current corresponding to the voltage of the anode node Vanode flows in the OLED 15, and the OLED emit light at a brightness corresponding to the signal voltage.

The N-channel transistor Tr3 is constantly on due to the DC voltage. This is necessary to hold Vanode for determining the light-emission brightness of the OLED 15. However, with the conventional pixel circuit, there is a problem in that the transistor Tr3 is constantly on, which means that power is continuously consumed regardless of the display state of the screen, even, for example, when displaying black over the entire screen.

Figure 5:
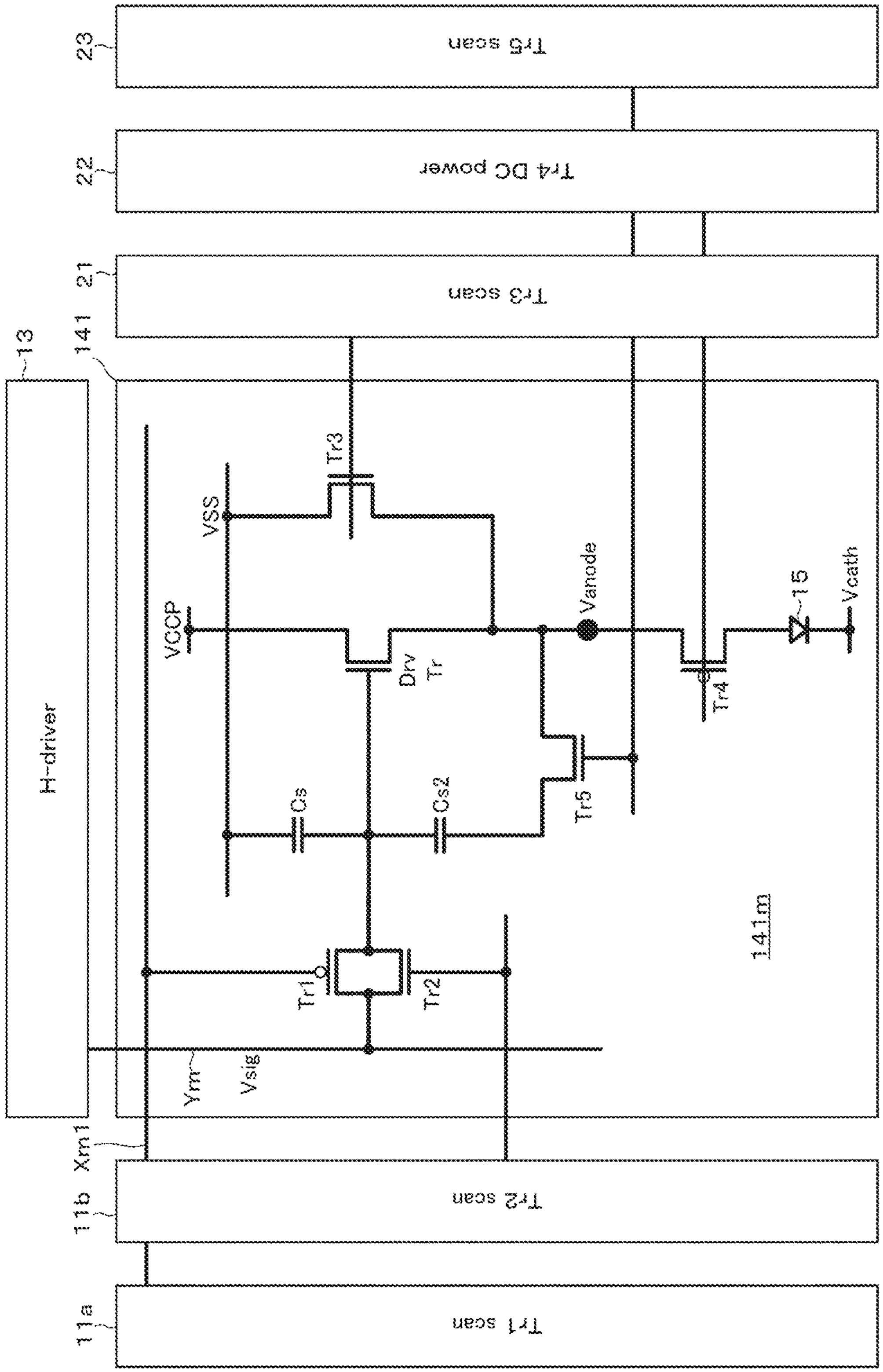
FIG. 5 is a connection diagram according to a first embodiment of the present technique.

A first embodiment of the present technique will be described next with reference to FIG. 5. A pixel unit according to the first embodiment is indicated by 141, and a pixel circuit by 141*m*. The pixel circuit 141*m* has a configuration in which a second holding capacitor Cs2 and a switching transistor Tr5 have been added to the above-described conventional configuration illustrated in FIG. 3. The holding capacitor Cs2 is connected between the gate of the drive transistor DrvTr, which serves as a first transistor, and the drain of the switching transistor Tr5, which serves as a third transistor, and the source of the switching transistor Tr5 is connected to the source of the drive transistor DrvTr. However, rather than the configuration illustrated in FIG. 5, the switching transistor Tr5 may be connected to the gate side of the drive transistor DrvTr, and the holding capacitor Cs2 may be connected to the source side thereof.

Furthermore, a pulse signal from a scan circuit 21 is supplied to the gate of the transistor Tr3, which is connected between the anode node Vanode and the power source and which serves as a second transistor for anode voltage setting that determines the voltage applied to the anode, and a DC voltage is supplied from a DC voltage supply unit 22 to the gate of the transistor Tr4. A pulse signal from a scan circuit 23 is supplied to the gate of the switching transistor Tr5 that has been added. The transistors Tr3 and Tr5 are of the same conductivity type (N-channel).

Figure 6:
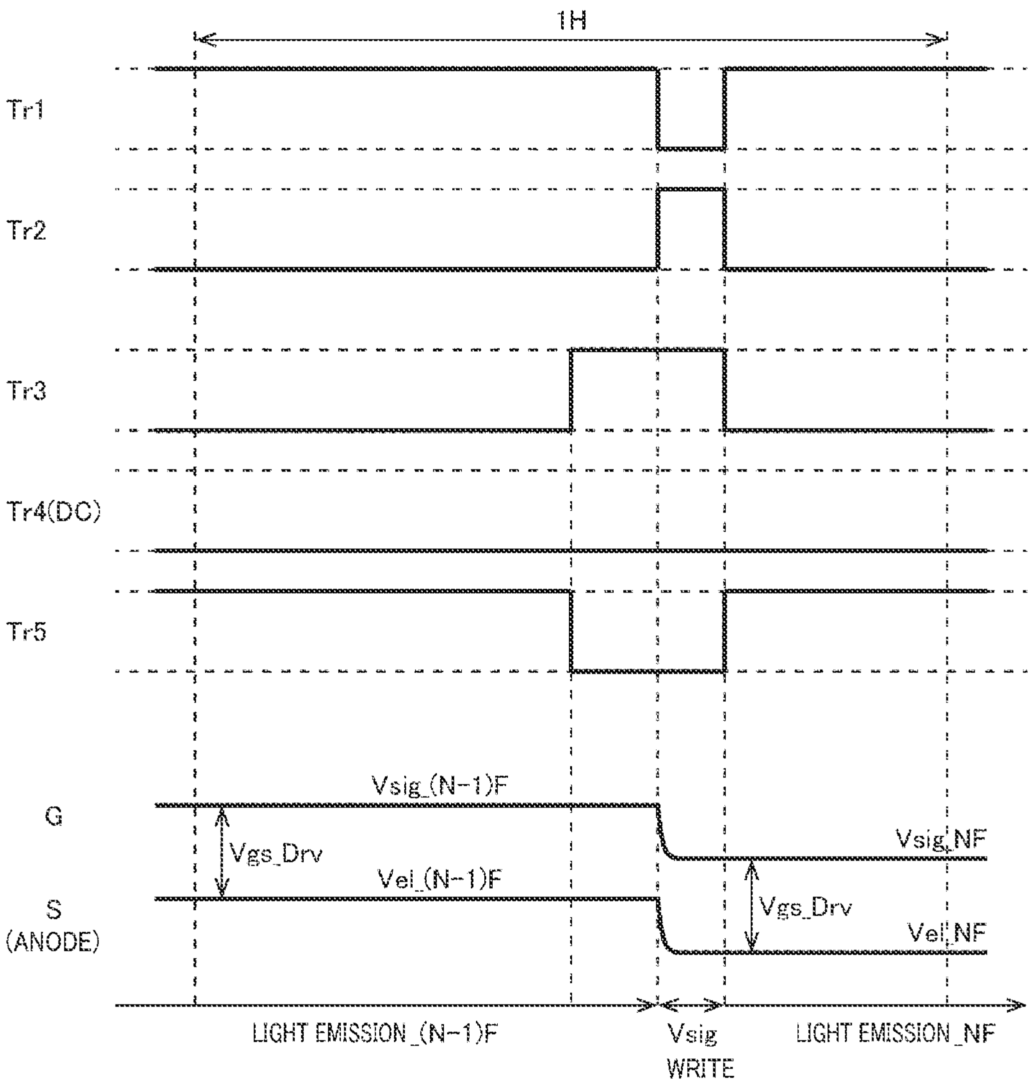
FIG. 6 is a timing chart illustrating operations according to the first embodiment.

FIG. 6 is a timing chart illustrating voltage driving of the pixel circuit 141*m* according to the first embodiment of the present technique. The transistor Tr4 is constantly on due to the DC voltage from the DC voltage supply unit 22. The transistors Tr1 and Tr2 turn on when writing a signal.

Additionally the transistor Tr3 is turned on by the pulse signal from the scan circuit 21 when writing a signal and near the end of a light-emission period before the writing of the signal. The transistor Tr5 is turned on at the same time as the transistor Tr3 turning off after the writing of the signal ends. The voltage of the anode node Vanode is held by the holding capacitor Cs2. In other words, due to the pulse signal that turns on when writing a signal being supplied to the transistor Tr3, the current flowing in the transistor Tr3 flows only in pixels in rows in which signals are written. This makes it possible to reduce the power compared to a configuration in which a DC voltage is applied to the transistor Tr3, as in the conventional technique.

Furthermore, the phase of the pulse that drives the transistors Tr3 and Tr5 is inverted, and the effects of charge injection on the anode node Vanode from the respective transistors can be canceled. The anode node Vanode can therefore be held precisely at (Vsig·Vgs_Drv).

Figure 7:
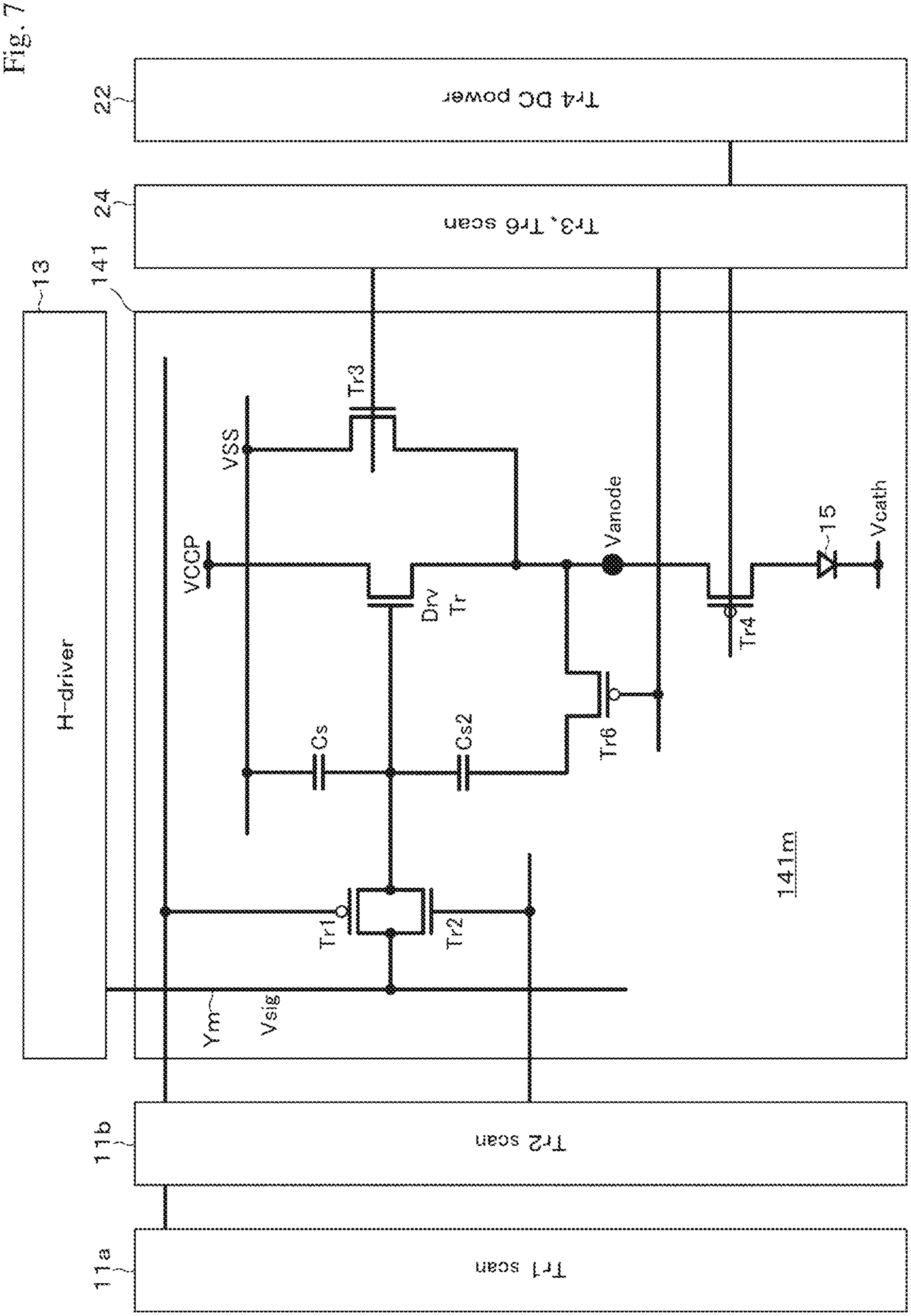
FIG. 7 is a connection diagram according to a variation on the first embodiment.
Figure 8:
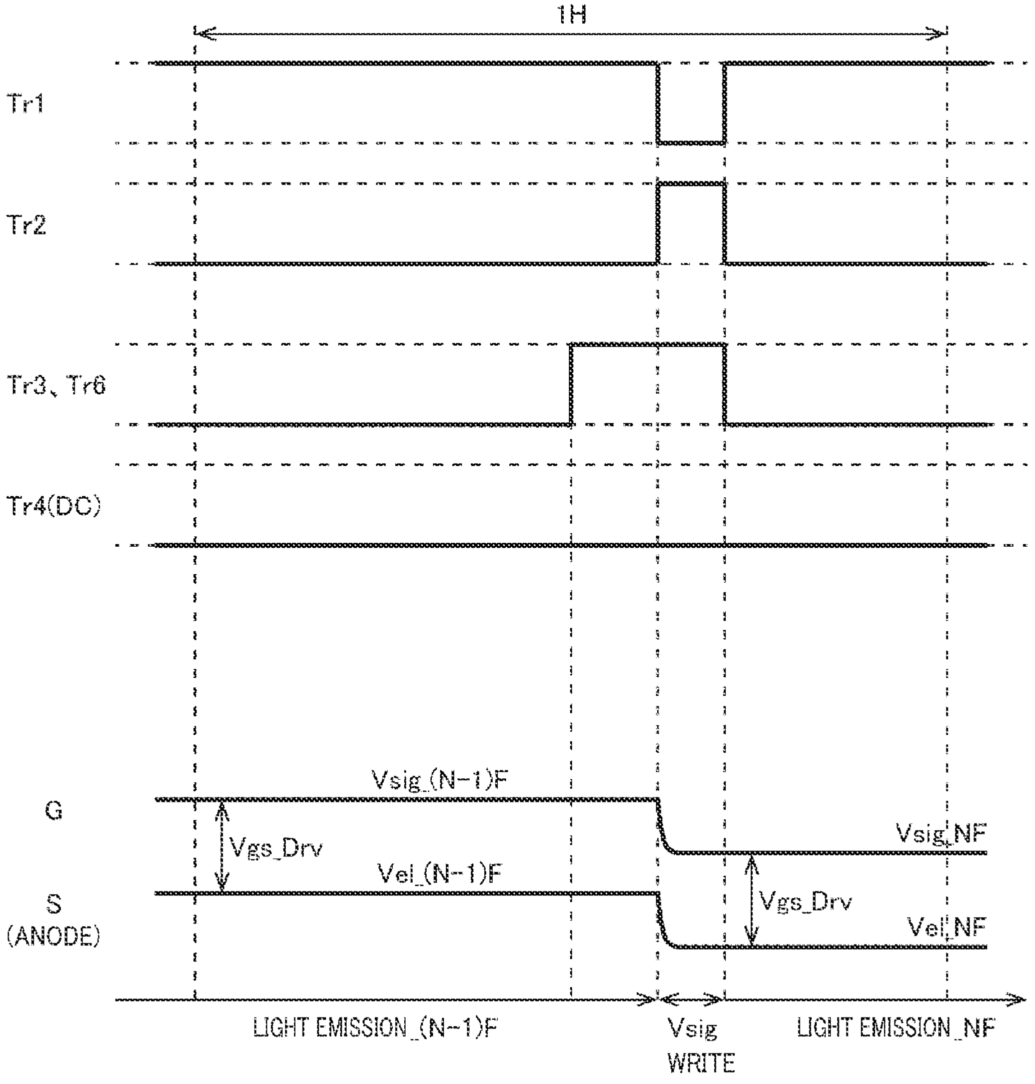
FIG. 8 is a timing chart illustrating operations according to the variation on the first embodiment.

FIG. 7 illustrates the configuration of a variation on the first embodiment. The switching transistor Tr5 has been changed to a P-channel switching transistor Tr6. FIG. 8 is a timing chart illustrating voltage driving according to the variation.

The transistor Tr3 and the switching transistor Tr6 have different conductivity types (N-channel and P-channel), and thus the transistor Tr3 can be turned from off to on, and the switching transistor Tr6 from on to off; using pulse signals of the same polarity. Accordingly, a shared scan circuit 24 may be provided for the transistor Tr3 and the switching transistor Tr6, which makes it possible to reduce the number of scan circuits by one.

Figure 9:
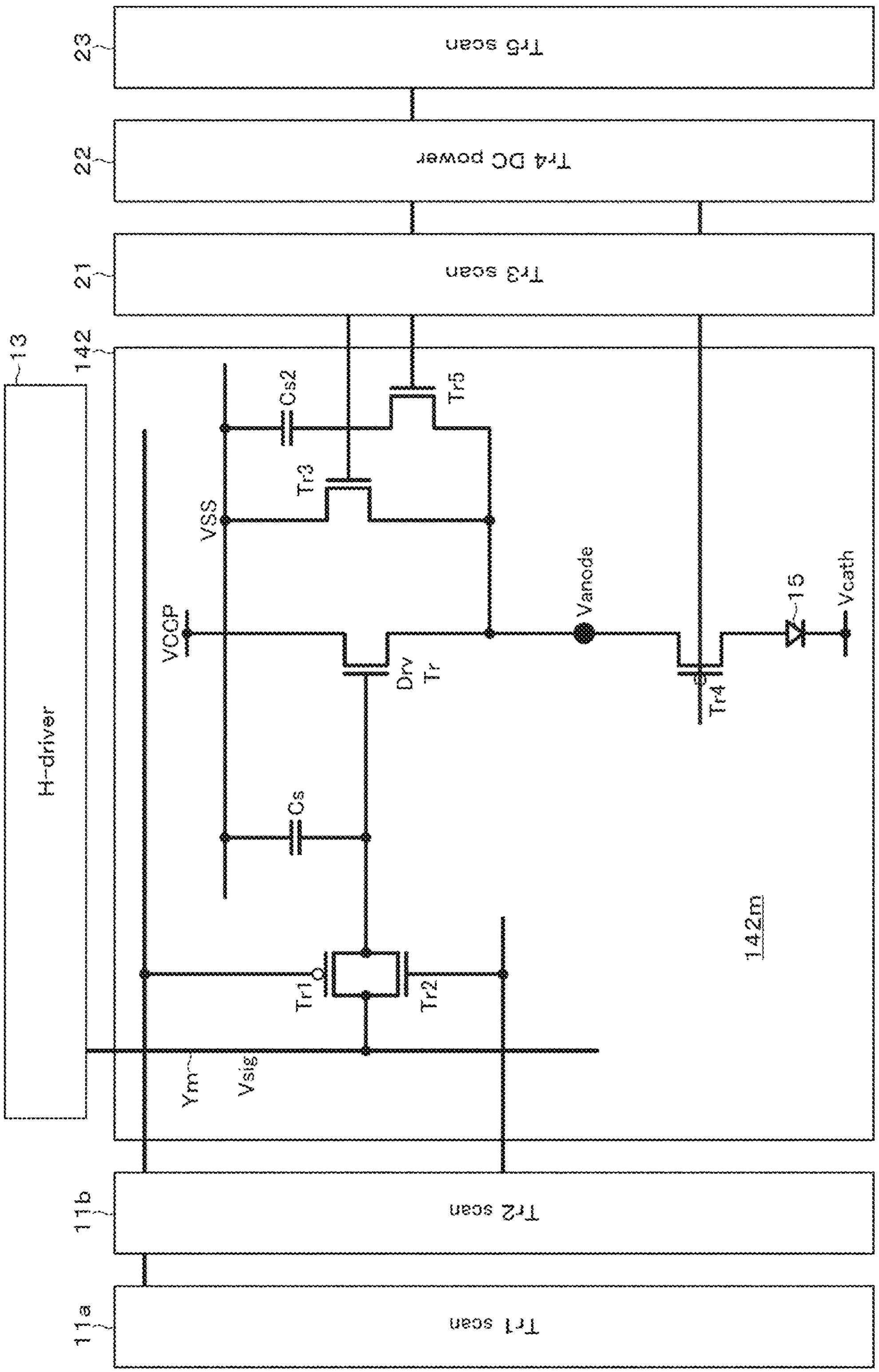
FIG. 9 is a connection diagram according to a second embodiment of the present technique.

A second embodiment of the present technique will be described with reference to FIG. 9. A pixel unit according to the second embodiment is indicated by 142, and a pixel circuit by 142*m*. The pixel circuit 142*m* has a configuration in which the second holding capacitor Cs2 and the switching transistor Tr5 have been added to the above-described conventional configuration illustrated in FIG. 3. The source of the switching transistor Tr5 is connected to the source of the drive transistor DrvTr, and the second holding capacitor Cs2 is connected between the drain of the switching transistor Tr5 and a power supply line to which a fixed power source, e.g., the DC voltage VSS, is supplied. However, rather than the configuration of FIG. 9, the connection order of the switching transistor Tr5 and the holding capacitor Cs2 may be reversed.

Figure 10:
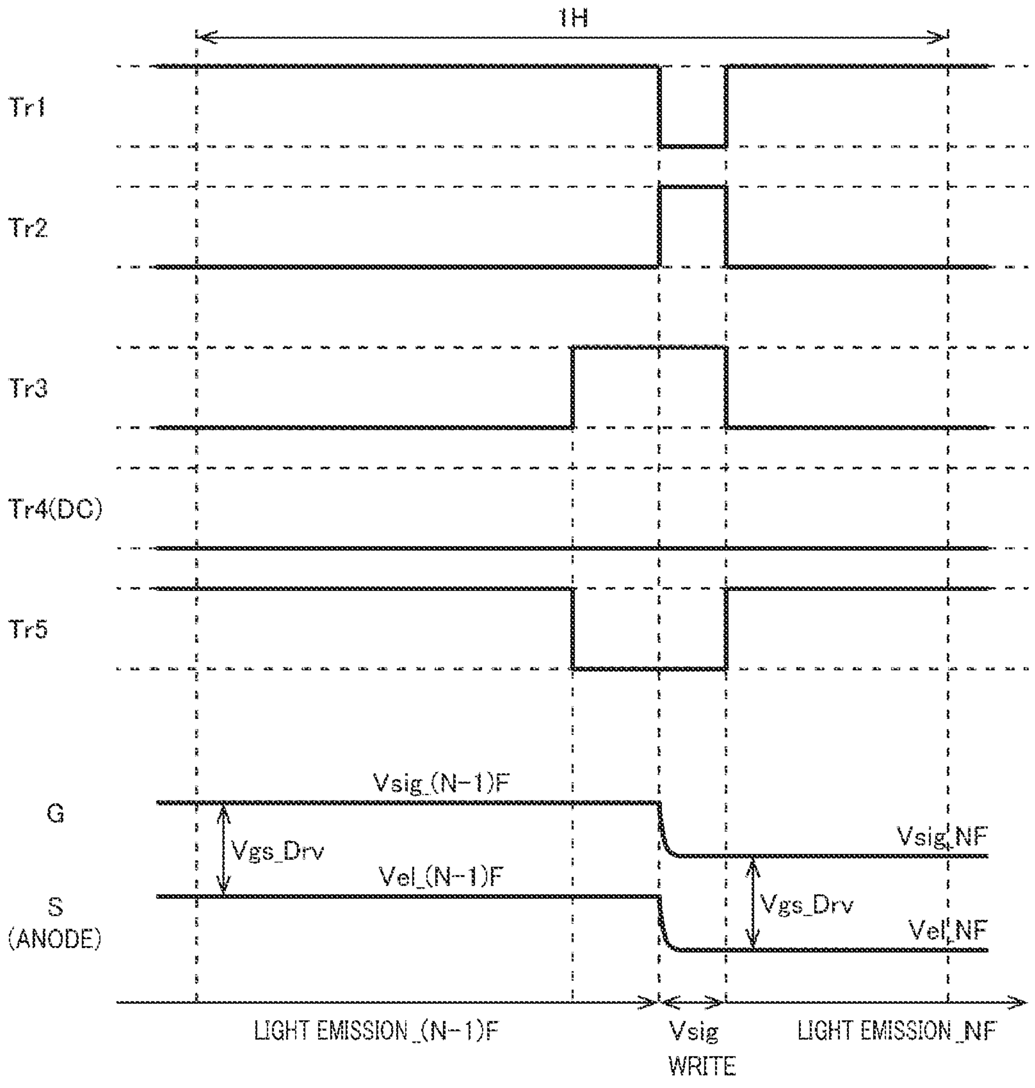
FIG. 10 is a timing chart illustrating operations according to the second embodiment.

FIG. 10 is a timing chart illustrating voltage driving of the pixel circuit 142*m* according to the second embodiment of the present technique. This is similar to the timing chart illustrating the operations according to the first embodiment. In other words, the transistor Tr4 is constantly on due to the DC voltage from the DC voltage supply unit 22. The transistors Tr1 and Tr2 turn on when writing a signal. Additionally, reverse-phase pulse signals are supplied from the scan circuits 21 and 23 to the transistor Tr3 and the switching transistor Tr5.

Like the first embodiment, in the second embodiment, the current flowing in the transistor Tr3 flows only in pixels in rows in which signals are written. This makes it possible to reduce the power compared to a configuration in which a DC voltage is applied to the transistor Tr3, as in the conventional technique. Furthermore, the phase of the pulse that drives the transistors Tr3 and Tr5 is inverted, and the effects of charge injection on the anode node Vanode from the respective transistors can be canceled.

Figure 11:
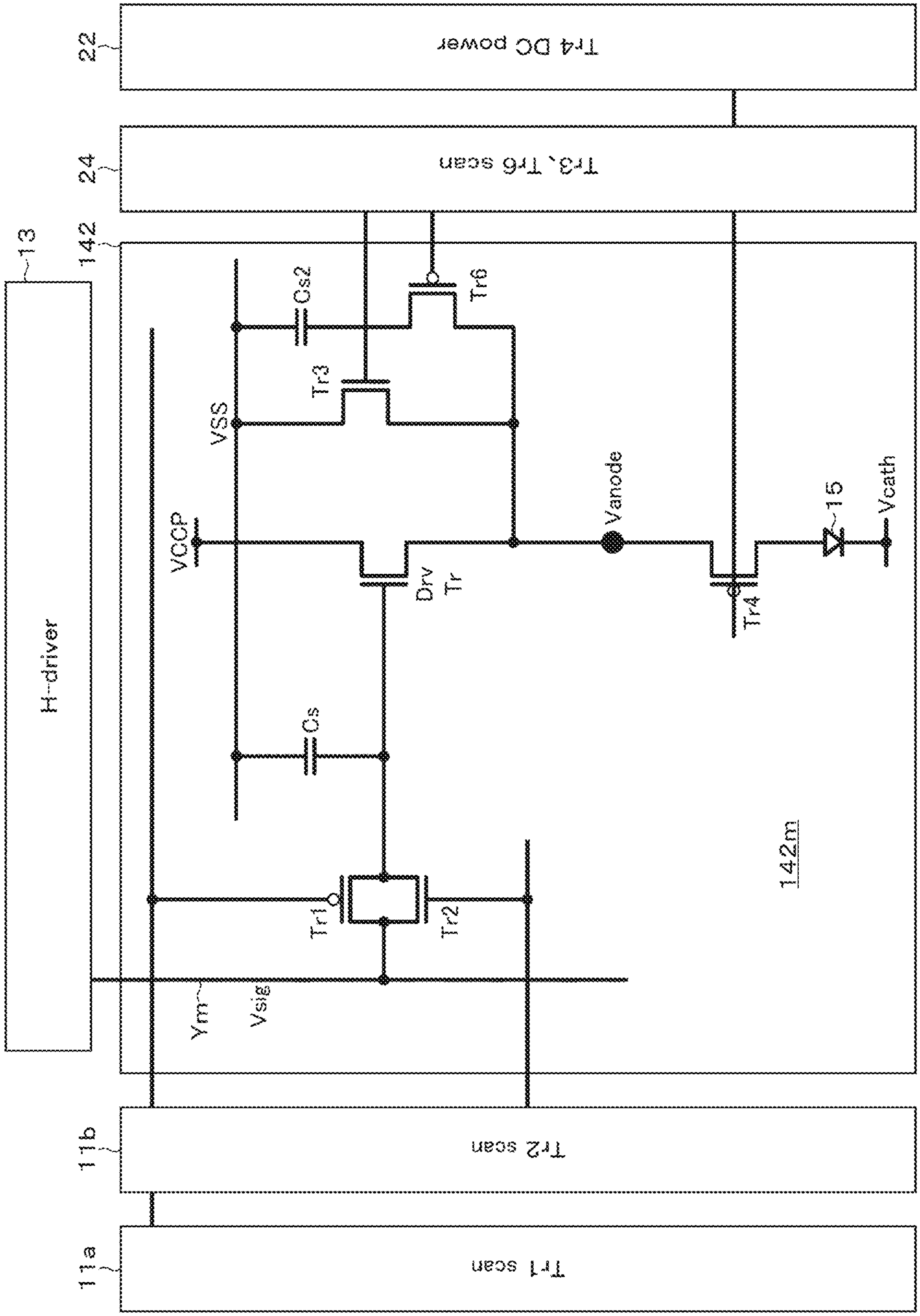
FIG. 11 is a connection diagram according to a variation on the second embodiment.
Figure 12:
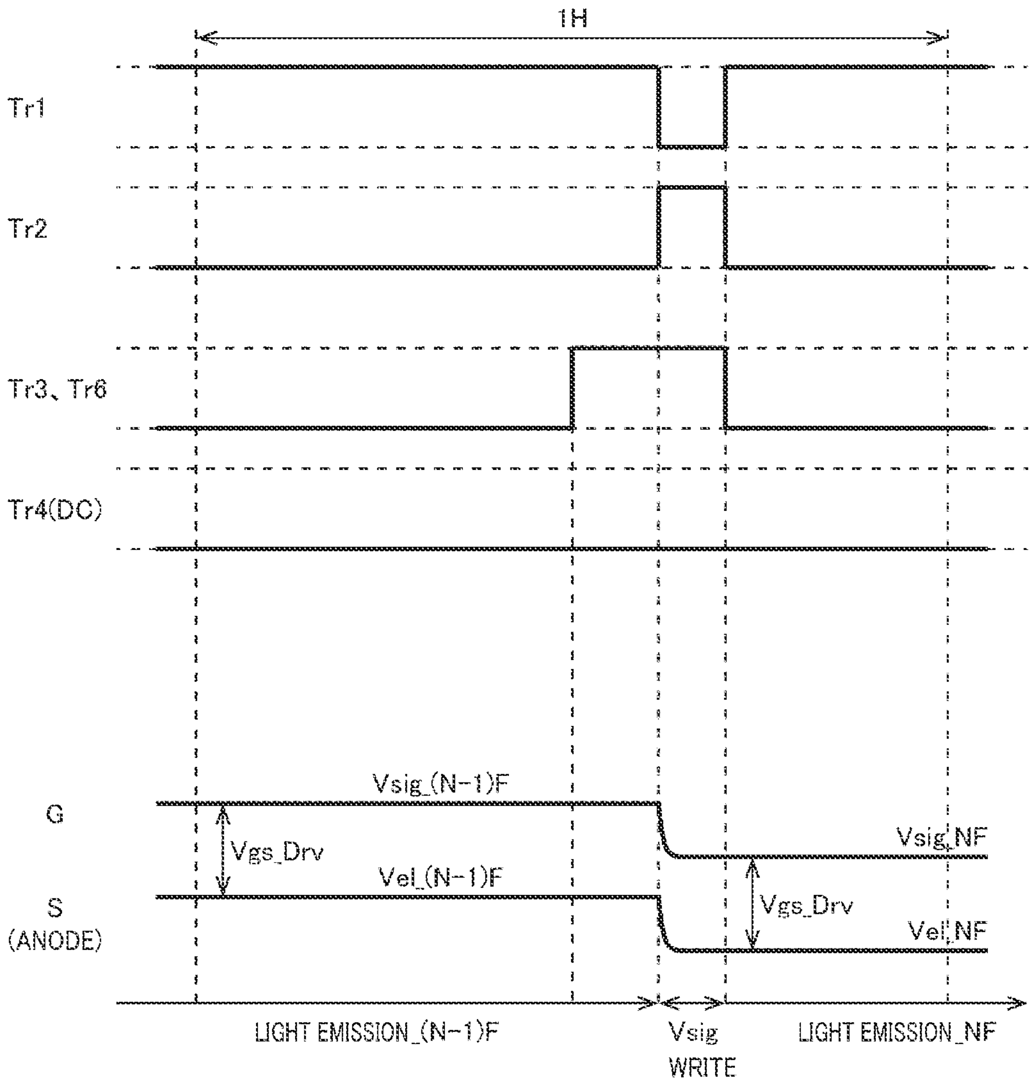
FIG. 12 is a timing chart illustrating operations according to the variation on the second embodiment.

FIG. 11 illustrates the configuration of a variation on the second embodiment. The switching transistor Tr5 has been changed to a switching transistor Tr6 having a different conductivity type from the transistor Tr3 (P-channel). FIG. 12 is a timing chart illustrating voltage driving.

The transistor Tr3 and the switching transistor Tr6 are N-channel and P-channel, respectively, and thus the transistor Tr3 can be turned from off to on, and the switching transistor Tr6 from on to off using pulse signals of the same polarity. Accordingly; a shared scan circuit 24 may be provided for the transistor Tr3 and the switching transistor Tr6, which makes it possible to reduce the number of scan circuits by one.

Although embodiments of the present technique have been specifically described above, the present technique is not limited to the above-described embodiments, and various modifications based on the technical spirit of the present technique are possible. For example, many variations such as those described hereinafter are possible. One or more of the forms of the variations described hereinafter may be selected as desired and combined as appropriate. Also, the configurations, methods, steps, shapes, materials, numerical values, and the like of the above-described embodiments can be combined with each other without departing from the spirit of the present technique.

For example, although the transistors Tr1 and Tr2 are provided to apply a signal voltage to the gate of the drive transistor DrvTr, only one of these transistors may be provided. Additionally, although the foregoing embodiments describe an OLED, which is a light-emitting element, as an example of an electro-optical element, any element that emits light at a brightness based on current, such as an inorganic light-emitting diode, an LED (Light Emitting Diode), or the like, for example, may be used.

An electronic device in which the electro-optical apparatus according to the embodiments and application examples is applied will be described next. The electro-optical apparatus is suitable for application in high-resolution displays having small pixel sizes. Accordingly; the apparatus can be applied in a display apparatus such as a head-mounted display, smart glasses, a smartphone, an electronic viewfinder of a digital camera, and the like, as the electronic device.

Further, the present technique may also be configured as below.

(1)

An electro-optical apparatus including an active-matrix drive circuit that applies a voltage based on an image signal tone to a light-emitting element, the apparatus including:

- a first transistor for driving, a source of the first transistor being connected to an anode of the light-emitting element;
- a second transistor for setting an anode voltage, the second transistor being connected between the anode and a power source, and determining a voltage applied to the anode; and
- a holding capacitor and a third transistor connected to the anode for holding the anode voltage during a light-emission period.

(2)

The electro-optical apparatus according to (1), wherein the second transistor is turned on in a signal writing period, and then the third transistor is turned on to hold the anode voltage.

(3)

The electro-optical apparatus according to (1) or (2), wherein the holding capacitor and the third transistor are connected between a gate and the source of the first transistor for driving.

(4)

The electro-optical apparatus according to any one of (1) to (3), wherein the holding capacitor and the third transistor are connected to the source of the first transistor for driving and a supply location of a DC potential.

(5)

The electro-optical apparatus according to any one of (1) to (4), wherein the second transistor and the third transistor have different conductivity types.

(6)

The electro-optical apparatus according to any one of (1) to (4), wherein the second transistor and the third transistor have the same conductivity type.

(7)

An electronic device including the electro-optical apparatus according to (1).

(8)

The electronic device according to (7), wherein, in the electro-optical apparatus, the second transistor is turned on in a signal writing period, and then the third transistor is turned on to hold the anode potential.

REFERENCE SIGNS LIST

11*a*, 11*b* Scanning line drive circuit
13 Data line (signal line) drive circuit
15 LED
21, 23 Scan circuit
22 DC voltage supply unit
DrvTr Drive transistor

The invention claimed is:

1. An electro-optical apparatus including an active-matrix drive circuit that applies a voltage based on an image signal tone to a light-emitting element, the apparatus comprising:

a first transistor for driving, a source of the first transistor being electrically connected to an anode of the light-emitting element, a drain of the first transistor being electrically connected to a first power supply line, the first power supply providing a first voltage;

a second transistor for setting an anode voltage, the second transistor being electrically connected between the anode and a second power supply line that provides a second voltage, to apply an anode voltage to the anode, the second voltage being different from the first voltage;

a third transistor electrically connected to the anode; and a first holding capacitor and a second holding capacitor electrically connected in series between the second power supply line and the third transistor, wherein a gate of the first transistor for driving is electrically connected to a node between the first holding capacitor and the second holding capacitor, the second holding capacitor and the third transistor are arranged to hold the anode voltage during a light-emission period, and the second holding capacitor and the third transistor are electrically connected to the source of the first transistor for driving.

2. The electro-optical apparatus according to claim 1, wherein the second transistor is turned on in a signal writing period, and then the third transistor is turned on to hold the anode voltage.

3. The electro-optical apparatus according to claim 1, wherein the second holding capacitor and the third transistor are electrically connected between a gate and the source of the first transistor for driving.

4. The electro-optical apparatus according to claim 1, wherein the second transistor and the third transistor have different conductivity types.

5. The electro-optical apparatus according to claim 1, wherein the second transistor and the third transistor have the same conductivity type.

6. An electronic device comprising the electro-optical apparatus according to claim 1.

7. The electronic device according to claim 6, wherein, in the electro-optical apparatus, the second transistor is turned on in a signal writing period, and then the third transistor is turned on to hold the anode potential.

8. The electronic device according to claim 6, wherein the second holding capacitor and the third transistor are electrically connected between a gate and the source of the first transistor for driving.

9. The electronic device according to claim 6, wherein the second transistor and the third transistor have different conductivity types.

10. The electronic device according to claim 6, wherein the second transistor and the third transistor have the same conductivity type.

11. The electronic device according to claim 6, wherein a data signal line is electrically connected to the node between the first holding capacitor and the second holding capacitor.

12. The electro-optical apparatus according to claim 1, wherein a data signal line is electrically connected to the node between the first holding capacitor and the second holding capacitor.

* * * * *